Dec. 17, 1968  KUNITOSHI TEZUKA  3,416,439
ROTARY SCRAP-METAL COMPRESSOR
Filed Sept. 2, 1966  3 Sheets-Sheet 1

INVENTOR
KUNITOSHI TEZUKA
BY
AGENT

Dec. 17, 1968  KUNITOSHI TEZUKA  3,416,439
ROTARY SCRAP-METAL COMPRESSOR
Filed Sept. 2, 1966  3 Sheets-Sheet 2

INVENTOR
KUNITOSHI TEZUKA
BY
AGENT

Dec. 17, 1968     KUNITOSHI TEZUKA     3,416,439
ROTARY SCRAP-METAL COMPRESSOR
Filed Sept. 2, 1966     3 Sheets-Sheet 3

INVENTOR
KUNITOSHI TEZUKA
BY
AGENT

United States Patent Office 3,416,439
Patented Dec. 17, 1968

3,416,439
ROTARY SCRAP-METAL COMPRESSOR
Kunitoshi Tezuka, 34 7-chome, Minamisuna-machi, Koto-ku, Tokyo, Japan
Continuation-in-part of application Ser. No. 501,499, Oct. 25, 1965. This application Sept. 2, 1966, Ser. No. 576,918
Claims priority, application Japan, Nov. 4, 1965, 40/67,210
11 Claims. (Cl. 100—223)

ABSTRACT OF THE DISCLOSURE

Rotary scrap-metal compressor for forming into blocks various iron and metal materials to be re-processed in a furnace, with a casing into which the materials are introduced, coaxial compressing means above the casing, and means for causing relative rotary displacement between the casing and the compressing means.

Preferably, a presser element forms part of the compressing means and is rotatably suspended above the casing, means being provided for rotating the presser element intermittently while the materials are intermittently compressed in the casing. The presser element may be made reciprocable.

In an alternative embodiment, the casing is rotatably supported below the compressing means which is stationary. Elevating rams may be disposed underneath the rotatable casing for moving the same to and from the presser element.

---

The present invention relates to a rotary scrap-metal compressor for making compactly pressed blocks from scrap metal of various kinds, said blocks having a predetermined weight and volume, suitable for being charged into melting furnaces for re-processing.

This application is a continuation-in-part of applicant's earlier, co-pending patent application Ser. No. 501,499, filed Oct. 22, 1965, now U.S. Patent 3,323,447, entitled "Scrap Compressor," and constitutes an improvement over the basic scrap-metal compressor embodiment disclosed and claimed therein.

It is known that scrap lumps include scrap metal of various shapes, thicknesses and sizes, and that the interior of scrap lumps thus collected contains voids of various sizes. For the compression of such scrap lumps into blocks, hitherto generally devices have been used wherein the scrap-metal lumps charged into a fixed casing are pressed down with a presser element having a flat compressing face. Thus the conventional compressors apply the compression force simultaneously to all surfaces of the scrap lumps, and therefore an extremely powerful force is required in order to obtain compactly pressed scrap-metal blocks.

To achieve this, all components of hitherto known devices, especially the compression casing, had to be made very strong so as to resist extreme compressing forces; this naturally involves large-scale and rather expensive apparatus.

It is the object of the present invention to provide a novel rotary-type scrap-metal compressor for forming such scrap lumps into uniform and fully compacted blocks, using only a relatively low or even insignificant compressing force of the device.

Another object of the invention relates to providing a compressor which is capable of charging scrap lumps uniformly into the compression casing so as to form the irregular scrap into uniformly shaped and uniformly compacted pressed scrap-metal blocks.

A still further object of the invention is to provide a rotary-type compressor which does not have to be extremely rigid in its compression casing or other component parts, yet is capable to press the introduced scrap metal or lumps into compact and small blocks, at low cost.

The subject matter of the present invention is closely related to applicant's co-pending patent applications, filed on even date with the present case, entitled "Scrap-Metal Compressor," Ser. No. 576,915, "Device for Removing Materials from a Compressor," Ser. No. 576,916, "Scrap-Metal Compressor," Ser. No. 576,917, and "Hoisting Sling Having Fusible Connection and Method for Charging Materials into a Furnace," Ser. No. 576,919. With a view to avoiding details in each of these applications which are only of a secondary importance, it should be understood that the disclosures of the simultaneously filed and co-pending applications are to be considered as complementing each other, where necessary.

According to important features of the present invention, the rotary scrap-metal compressor comprises a presser element mounted substantially centrally above a compression casing and having an uneven pressing face, a mechanism being provided for causing relative rotary displacement between said casing and said presser element.

According to further features, the presser element is preferably mounted on a supporting plate which can be reciprocated into and out of said casing.

In the compressor according to the present invention, scrap lumps thrown into the casing are subjected to the concentrated compression of the presser plate or element so that there will thereby be caused internal shifts within the scrap lungs. Owing to the compacting and intermixing of the scrap-metal elements, the voids therein and therebetween are apt to be filled up with the scrap material proper, and the portion which has suffered said concentrated compression will become compactly compressed. Thereafter, a rotary relative displacement or movement is caused between the presser element and the compression casing, for example, by rotating either the presser element or the casing, or both.

The compression is repeated after the relative displacement, so that the scrap lumps will undergo concentrated compression in all its portions, even those which may have had no compression at first. By alternatively repeating the compression and the rotation, the scrap metal will be formed into uniform and very compact pressed blocks.

The present invention will be better understood, and additional advantages thereof will become more apparent, upon perusal of the following description of exemplary, preferred embodiments thereof, taken in conjunction with the appended drawing, wherein FIG. 1 is a partly sectional frontal view of one embodiment of the rotary scrap-metal compressor according to the present invention;

Figure 1:
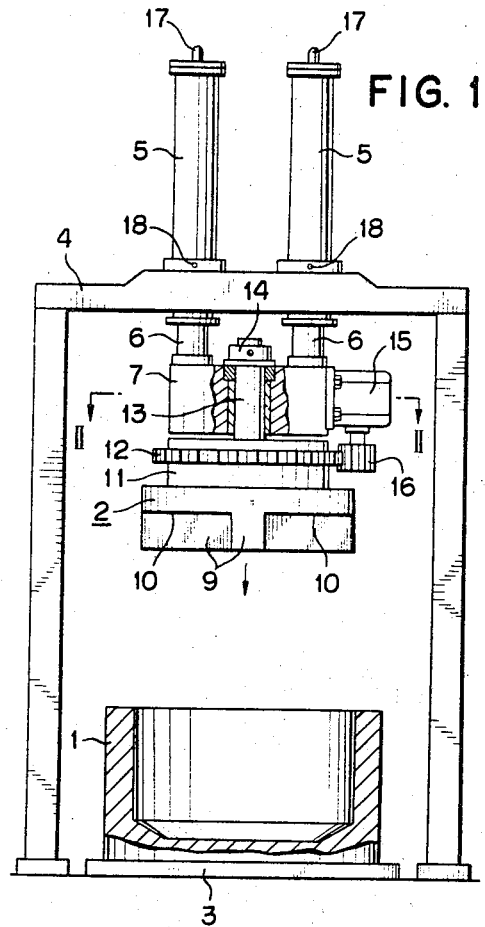
Figure 2:
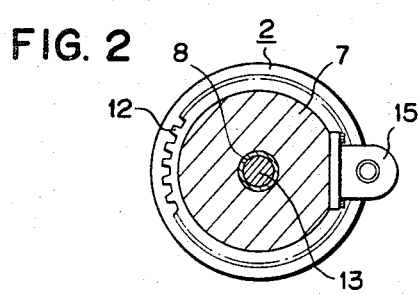
FIG. 2 is a sectional view, taken along lines II—II of FIG. 1.
Figure 3:
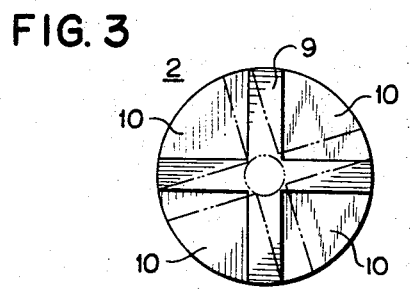
FIG. 3 is a bottom view of a presser element forming part of the compressor as shown in FIGS. 1 and 2.

Referring to the drawing, the compressor as illustrated in FIGS. 1 to 3 comprises a mechanism for the above-mentioned relative rotary displacement, including a fixed compression casing 1 and a presser element 2 rotatable by appropriate drive means. The casing 1 is preferably cylindrical and open at its upper end, and fixed on a bed 3. Two oil-pressure cylinders 5 are provided as drive means for reciprocating the presser element 2, mounted on a frame 4 installed over the casing, and parallel to its vertical axis. The lower end of a ram 6 of each cylinder 5 is secured with a supporting plate 7 having an axial hole 8 at its center.

As shown in FIG. 3 in more detail, the underside of the presser element 2 is formed with convex-shaped protrusions 9 having the form of a cross, for example, and concave-shaped portions 10 intermediate the limbs of the cross. A gear 12 is disposed on the periphery of a disk 11 connected with the upper part of the presser element 2, and a shaft 13 is provided protrudingly at the center of the upper face of the disk 11.

The shaft 13 of the presser element is rotatably inserted into the axial hole 8 of the plate 7, and is connected in a rotatable manner with the supporting plate 7 by having a stop ring 14 secured to the upper end of the shaft 13. With these structural provisions, the presser element 2 has its center line correspond to or coincide with that of the casing 1.

As shown in FIG. 1, a motor 15 is associated with or built into a speed-reduction mechanism serving as a drive means for rotating said presser element 2. The motor 15 is mounted on the side of the plate 7, and a pinion 16 associated with the motor or the speed-reduction mechanism engages drivingly the afore-mentioned gear 12, surrounding disk 11.

Now, the operation as well as the function of the rotary scrap-metal compressor will be described as follows:

The description will start with the condition of the components as shown in FIG. 1 of the first embodiment. Scrap lumps are thrown into the compression casing 1. The supporting plate 7 is lowered by means of hydraulic fluid introduced into the cylinders 5 through pipes 17 so that the element 2, connected therewith, is lowered into casing 1. The scrap lumps will thus be subjected to an at least partial compression, particularly at the location of the protrusions 9 of the presser element 2. Thereafter, the latter is raised again to its original position by means of the hydraulic fluid being allowed to act on the cylinder 5 through other pipes 18; the motor 15 is then started and the element 2 is rotated at low speed, by means of rotational force transmitted from the pinion 16 to the gear 12. After a small-degree rotation, the element 2 is brought to a stop when the motor is disenergized. The desired rotational angle of the presser element 2 should correspond to a degree such that the external ends of the protrusions 9 are shifted to a position or portions of the scrap lumps which have not undergone compression as yet. With four protrusions 9 provided in element 2, as shown as a matter of example, the angle may range from about 15 to about 45 degrees. It will be understood that there may be three, five or more such protrusions instead of four.

Subsequent the rotation of element 2, the latter is again lowered by actuating cylinder 5, as explained before, and the scrap lumps in the casing 1 will now suffer a concentrated compression force in other portions thereof which have not undergone the first compression. The partial compression with the presser element 2, followed by a small angular displacement thereof, will be repeated several times. The alternating operations result in pressed scrap-metal blocks which have a uniform compactness and, moreover, a substantially large apparent specific gravity.

Figure 4:
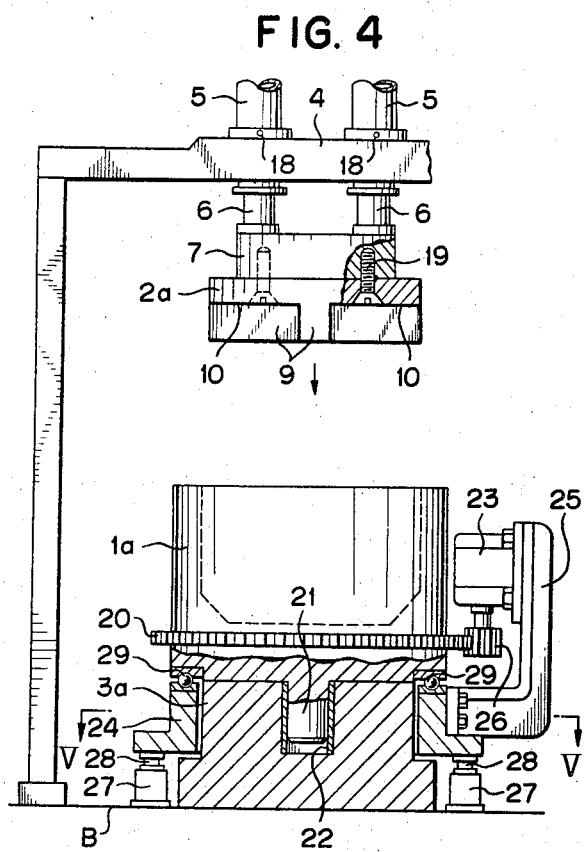
FIG. 4 is a view similar to that of FIG. 1, of an alternative embodiment of the inventive compressor, with parts being cut away.
Figure 5:
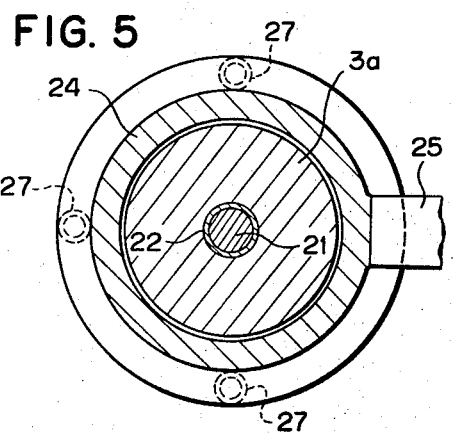
FIG. 5 is a sectional view, taken along lines V—V of FIG. 4.

The first alternative, preferred embodiment according to the invention, as shown in FIGS. 4 and 5, comprises in its relative rotary displacement mechanism a non-rotary presser element 2a and a compression casing 1a which is rotatable by appropriate drive means.

The element 2a is similar to the element 2 described before; however, with the difference that the shaft 13, the gear 12, the motor 15, etc. have been omitted, so that the element 2a is screw-fitted or otherwise rigidly attached to the supporting plate 7 by way of a plurality of bolts 19.

The casing 1a, in turn, has a gear 20 at its lower periphery and a shaft 21 protruding from the center of its lower end face, so that the casing is rotatably mounted on a columnar bed 3a, the shaft 21 being rotatably inserted into an axial hole 22 disposed in the center of the bed 3a. A motor 23 with a reduction gear, for driving the casing 1a, is mounted onto an arm 25 secured to a support or lifter 24, to be explained later in more detail. A pinion 26, secured to the drive shaft of the motor or reduction gear, meshes with the afore-mentioned gear 20 surrounding casing 1a.

This alternative embodiment is provided with supporting or lifting means for facilitating smooth rotary movement of the casing. A substantially ring-shaped member, constituted by the afore-mentioned support or lifter 24, is inserted between the periphery of the bed 3a and the lower end face of the casing 1a. The bottom surface of the lifter 24 is supported by a number of small-size oil-pressure cylinders 27 provided vertically on a base B. A plurality of balls 29 is interposed between the lower end face of casing 1a and rams 28 associated with the individual cylinders 27. Thus, the entire weight of the casing and its contents is borne by the support or lifter 24 when the rams 28 are projected, so that said lower end face will be located slightly above the upper surface of the bed 3a, dispensing with frictional effects therebetween so that rotation of the casing 1a will be much easier. It will be understood that the balls 29 may be constituted by wheels or other rolling elements known per se.

Describing now the operation of the first alternative embodiment, it should be noted that conventionally, the scrap lumps will be introduced into the casing 1a by way of a hopper (not shown) or similar conventional means. Thus, the charging will necessarily be one-sided so that the lumps will pile up inside the casing on one side more than on the others. Without the mechanism for producing relative displacement between the casing and the pressing means, it would be impossible not only to throw scrap lumps in sufficient quantities into said casing but also to obtain uniformly compact and regular-shaped blocks.

Thus, the cylinders 27 will be furnished with a hydraulic fluid so as to elevate lifter 24 and push up casing 1a; in this condition, the latter may be rotated at slow speed when motor 23 is started. The scrap lumps are continually introduced into the casing while it continues its rotation so that the lumps will be piled up in a substantially uniform manner. The motor 3 can now be stopped and the casing 1a can be lowered, once its rotation has stopped, by disenergizing the cylinders 27.

Thenceforth partial, concentrated compression of the scrap metal is performed, as in the previous embodiment, by forcing down the presser element 2a and alternatingly rotating the casing 1a in small increments. It is advisable to raise the lifter 24 before every rotary displacement of the casing, as explained before. The resultant blocks will be uniformly compact and fully compressed, as with the first embodiment of the inventive compressor, as shown in FIGS. 1–3.

Figure 7:
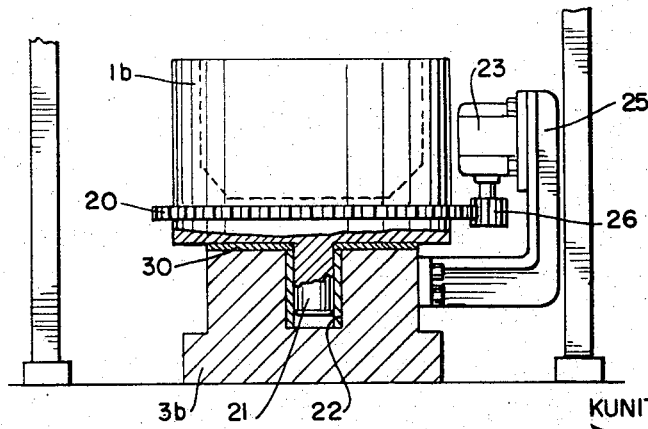
FIG. 7 is a detail view of a modified casing structure.

The invention also contemplates the provision of other embodiments, having a construction substantially identical with that of FIG. 4 except for the afore-mentioned supporting or lifting means. As shown in FIG. 7, a modified casing structure includes a casing 1b resting directly on a bed 3b and having a washer 30 interposed between the interengaging contact faces of the casing and the bed. Alternatively, a lubricant or the like may be used (not shown) for smoothening the rotation of the casing 1b. The support or lifter shown in FIGS. 4 and 5, as well as the elevating rams and cylinders and the balls between the casing and the lifter, all as shown in the previous embodiment, are of course, omitted in the modification. The bed 3b directly carries an arm 25b which supports the above-described rotating motor 23.

Furthermore, another alternative embodiment of the inventive compressor may be realized wherein the non-rotary presser element 2a in the embodiment of FIG. 4 is replaced by a rotatable pressure element 2, as shown in FIGS. 1–3. This will allow either or both of the presser element 2 and the casing 1a to be moved, simultaneously or alternately, for achieving the relative rotational displacement.

Figure 6:
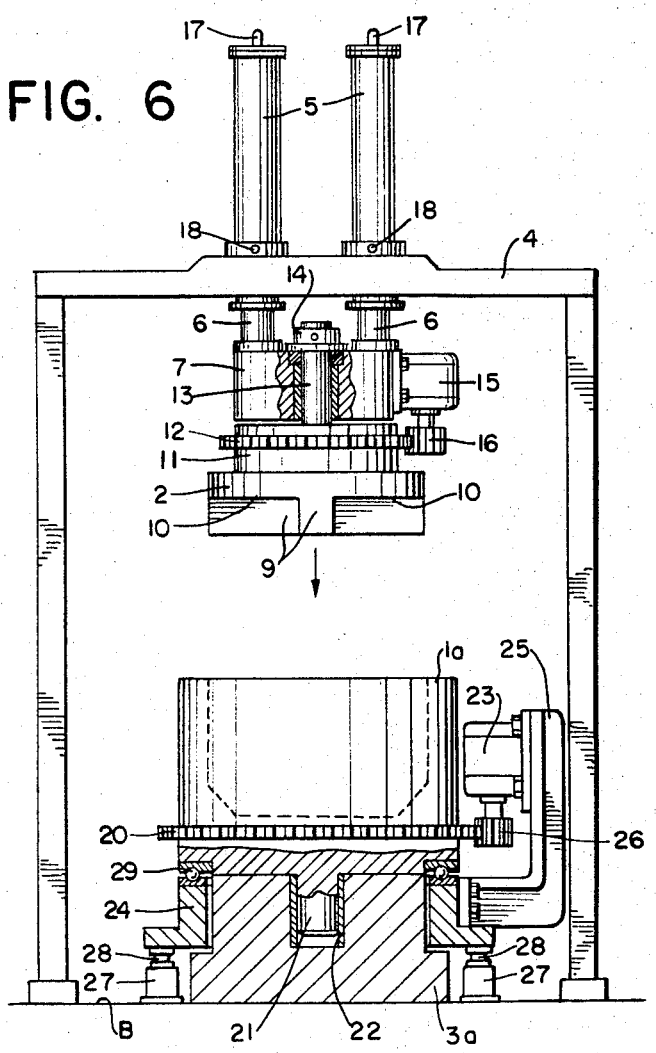
FIG. 6 is a view similar to that of FIG. 1 of another alternative compressor embodiment.

This is shown in FIG. 6, actually constituting a combination of the features of the first and second inventive embodiments (FIGS. 1 to 3 and 4, 5, respectively). The upper portion of the structure corresponds to FIG. 1 while the lower one to FIG. 4, both the presser element and the casing being rotatable by the respective drive means 15 and 23. For the sake of example, the rotation of the casing may be restricted to the charging phase of the operation, while for the gradual and progressive compacting, the rotation may be imparted to the presser element.

Figure 9:
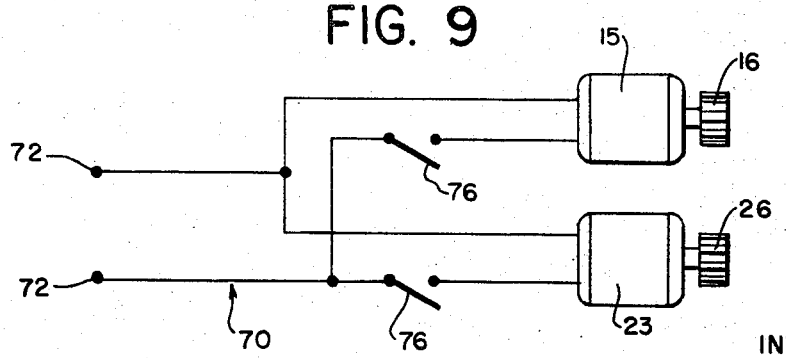
FIG. 9 is a schematic electric control circuit for selectively actuating the drive means of the compressor.

A schematic electric control circuit 70 is shown in FIG. 9, including an electric source 72 and appropriate switches 76 for energizing and stopping the motors 15, 23 at a predetermined rate, in accordance with the operational phases or cycles of the compressor. By the intercalation and connection of appropriate mechano-hydraulic or electro-hydraulic means, the oil-pressure cylinders 5 and/ or 27 may also be made part of the control system.

In any modification of the present invention, as described in the foregoing specification, the shape, number, and other structural details of the respective convex and concave parts of the presser element will not be limited to those shown in the drawing (namely, in FIGS. 1, 3 and 4), but it should be understood that these details may be modified in accordance with the kinds of scrap metal or other material to be processed, requiring other configurations for achieving the best results, and also in accordance with the required sizes of the resulting compressed blocks.

Figure 8:
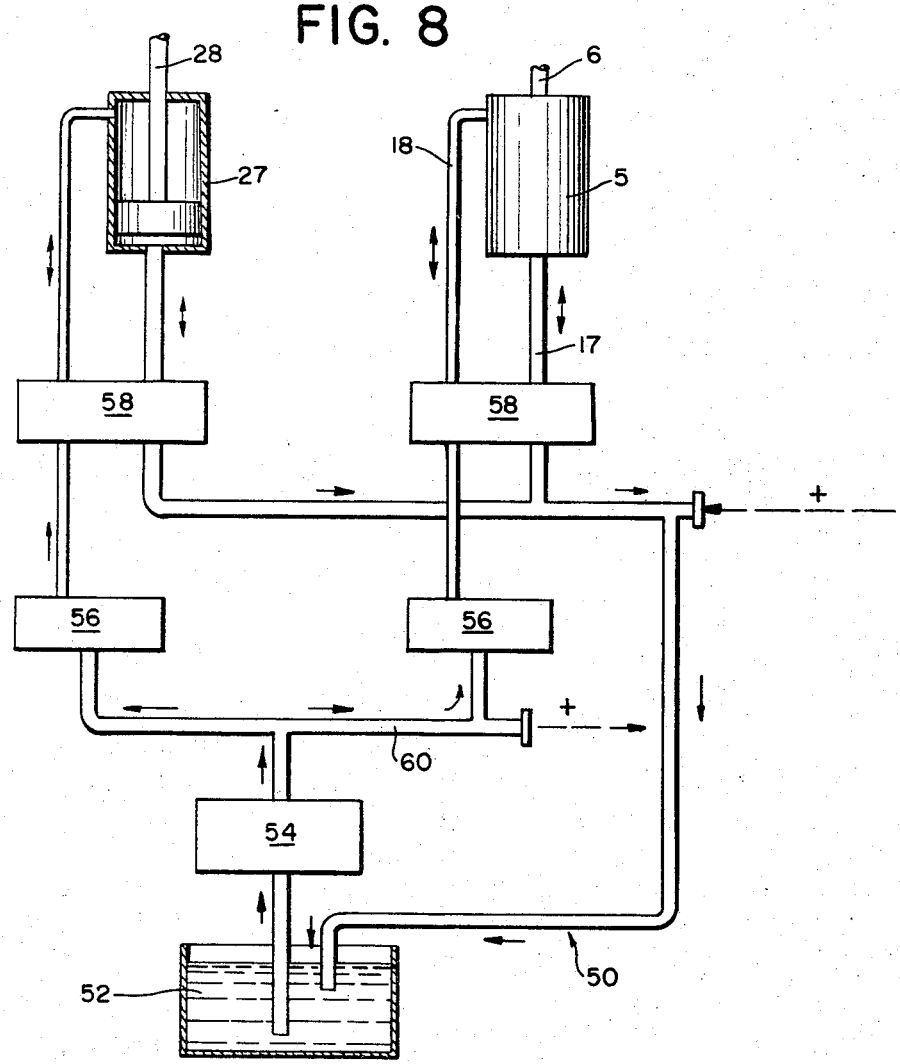
FIG. 8 is a schematic illustration of an actuating system for the rams and cylinders of the scrap-metal compressor.

With reference to the schematic illustration of FIG. 8 it should be noted that the invention contemplates the provision of an actuating system or mechanism generally designated by numeral 50, for the rams and cylinders of the compressor. In a conventionally known manner, the feed pipes (such as, for example, 17 and 18) leading to and from the oil-pressure or hydraulic cylinders are connected in the system 50 to a source of hydraulic fluid, for example, an oil tank 52. A conventional hydraulic pump 54 may convey the fluid to said feed pipes over appropriate valves 56 and change-over switches 58. A pressurized fluid tank (not shown) may be provided on the discharge side of the pump 54 which branches off to the feed pipes by way of a single feed pipe 60, by the intermediary of the valves 56. The discharge pipes lead back to the tank 52 either directly, as shown, or by way of the same valves (not shown).

Owing to this arrangement, each ram may be moved back and forth (that is, up and down, as viewed in FIGS. 1, 4 and 6), synchronously or separately.

The change-over valves 56 may be provided, in conjunction with controlling and supervisory devices (not shown), depending upon the degree of automation desired when operating the scrap-metal compressor according to the invention.

Instead of the above-mentioned pressurized-water, oil or other hydraulic-fluid system, other hydraulic or similar systems may be used to the same effect. The cylinders and rams mentioned in the specification should be considered with these possible mechanical and functional equivalents in mind.

It should be noted that one or more hydraulic pumps 54, compressors, or other sources of pressurized fluid may be provided in the actuating system 50 in a conventional manner.

The foregoing disclosure relates only to preferred, exemplary embodiments of the invention, which is intended to include all changes and modifications of the examples described, within the scope of the invention as set forth in the appended claims.

What I claim is:

1. A rotary scrap-metal compressor comprising, in combination, a compressor casing for receiving materials to be compressed, compressing means substantially coaxially mounted above said casing and including a presser element having an uneven lower face toward said casing. means for causing relative rotary displacement between said casing and said compressing means, ram means for moving said presser element toward said away from said casing, and a supporting plate rigidly secured to said ram means and permitting movement of said presser element with respect to said ram means.

2. The compressor as defined in claim 1, wherein said presser element is rotatably suspended from said supporting plate and is provided with peripheral gear means, and said rotary displacement means includes drive means attached to said supporting plate and serving to rotate said presser element.

3. The compressor as defined in claim 2, wherein said presser element has a shaft passing through a bore of said supporting plate, substantially coaxially with said casing, and said ram means includes two reciprocable rams spaced apart from said bore of the supporting plate.

4. A rotary scrap-metal compressor comprising, in combination, a compression casing for receiving materials to be compressed, compressing means substantially coaxially mounted above said casing and including a presser element having an uneven lower face toward said casing, means for causing relative rotary displacement between said casing and said compressing means, ram means for moving said presser element toward and away from said casing, and a supporting plate interposed between said ram means and said presser element, wherein said casing is rotatably supported and is provided with peripheral gear means, and said rotary displacement means includes drive means serving to rotate said casing.

5. The compressor as defined in claim 4, further comprising bed means underneath said casing, a substantially central shaft on the underside of said casing being adapted to protrude into and rest in an axial hole of said bed means.

6. The compressor as defined in claim 5, wherein said casing has peripheral lower face portions protruding beyond said bed means, and further comprising annular supporting means underneath said face portions, and a number of elevating rams on which said supporting means rests.

7. The compressor as defined in claim 6, wherein said drive means is attached to said supporting means, and further comprising rolling means interposed between the top surface of said supporting means and said face portions of the casing.

8. The compressor as defined in claim 7, further comprising oil-pressure actuating means for said ram means and said elevating rams, allowing selective operation thereof independently from each other.

9. The compressor as defined in claim 5, wherein said drive means is attached to said bed means, and further comprising anti-friction means interposed between said underside of the casing and at least a portion of the top surface of said bed means.

10. The compressor as defined in claim 5, wherein said presser element is rotatably suspended from said supporting plate, and said rotary displacement means further includes second drive means serving to rotate said presser element independently from the rotation of said casing.

11. The compressor as defined in claim 10, further comprising control means allowing selective operation of said first-named and said second drive means independently from each other.

(References on following page)

References Cited

UNITED STATES PATENTS

| | | | |
|---|---|---|---|
| 930,787 | 8/1909 | Olson | 100—223 |
| 2,018,932 | 10/1935 | Thorne | 100—238 XR |
| 2,205,133 | 6/1940 | Bragg | 100—223 XR |
| 2,507,491 | 5/1950 | Crea. | |
| 3,253,537 | 5/1966 | Porter et al. | 100—238 |
| 3,323,447 | 6/1967 | Tezuka | 100—238 |

FOREIGN PATENTS 249,425   3/1926   Great Britain.

WILLY J. WILHITE, *Primary Examiner.*

U.S. Cl. X.R.

100—238, 246, 269, 264, 270, 295

PO-1050 (5/69)

UNITED STATES PATENT OFFICE
CERTIFICATE OF CORRECTION

Patent No. 3,416,439      Dated December 17, 1968

Inventor(s) Kunitoshi Tezuka

It is certified that error appears in the above-identified patent and that said Letters Patent are hereby corrected as shown below:

Column 6, line 8 (claim 1), change "compressor" to -- compression --;
    column 6, line 11 (claim 1), change "casing." to -- casing, --; and
    column 6, line 14 (claim 1), change "toward said away" to -- toward and away --.

SIGNED AND SEALED

JUL 29 1969

(SEAL)
Attest:

Edward M. Fletcher, Jr.
Attesting Officer

WILLIAM E. SCHUYLER, JR.
Commissioner of Patents